Oct. 28, 1969　　　W. GORDON　　　3,474,809
NORMALLY-CLOSED EXPLOSIVE-OPERATED VALVE
Filed Dec. 27, 1965
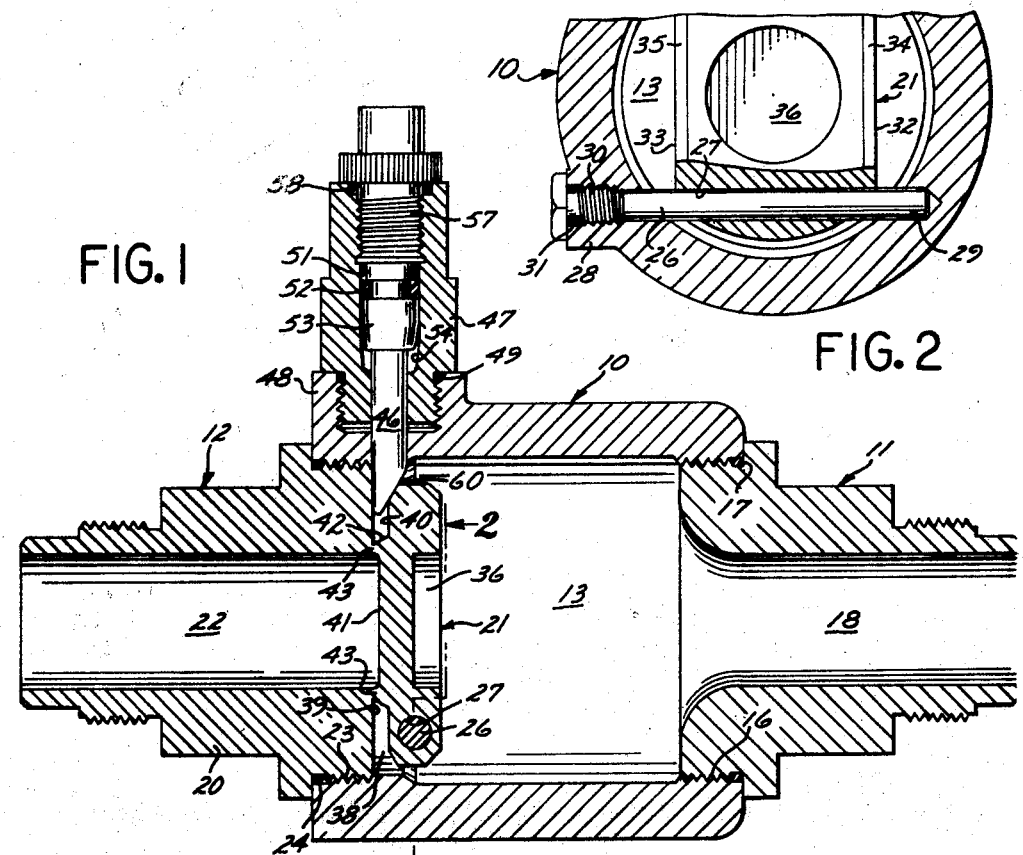
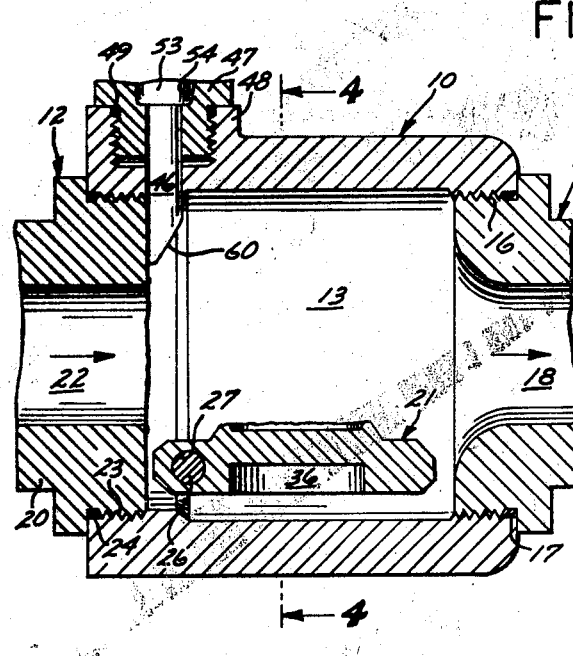
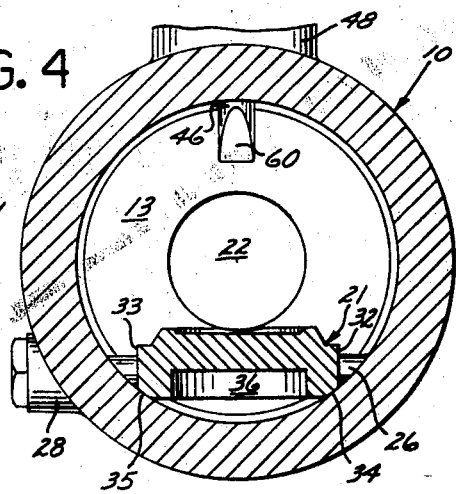
INVENTOR.
WILLIAM GORDON
BY
ATTORNEYS

United States Patent Office 3,474,809
Patented Oct. 28, 1969

3,474,809
NORMALLY-CLOSED EXPLOSIVE-OPERATED VALVE
William Gordon, Placentia, Calif., assignor to Pyronetics, Inc., Santa Fe Springs, Calif., a corporation of California
Filed Dec. 27, 1965, Ser. No. 516,226
Int. Cl. F16k *13/04, 17/14, 17/40*
U.S. Cl. 137—70                23 Claims

ABSTRACT OF THE DISCLOSURE

A normally-closed explosive-operated valve in which a movable valve element is connected by a frangible connection to a wall means around an opening therein. A fixed pivot axis is provided for the movable valve element, at a location radially-outwardly from one side of the opening, and an explosive-operated ram is wedgingly associated with the movable valve element at the opposite side of the opening. Shifting of the ram toward the pivot axis creates a wedging action whereby the frangible connection is first broken at a region adjacent the ram, and then at regions progressively closer to the axis.

---

This invention relates to an explosive-operated valve of the normally-closed type.

There exists a major need for a normally-closed explosive-operated valve capable of conducting fluids at extremely high flow rates, and under high-pressure conditions. In order to achieve high flow rates, the passage diameters must be large, thus making it impractical or impossible to use many types of explosive-operated valves known in the art. One particularly important problem relates to the opening of the valve by means of a compact, short-stroke actuator which may be readily shifted through utilization of a small explosive squib adapted to be fired by a low electrical current. Such actuator should not be disposed, at any time, in blocking relationship to the flow passage.

One prior-art approach to explosive-operated valves having large passage diameters, and thus capable of high flow rates, involved the use of relatively thin diaphragm elements provided in sealing relationship over the inlet passage. Such valves were, however, subject to various ones of the following (and other) important disadvantages:

(a) They were not capable of withstanding inlet fluid pressures on the order of many thousands of pounds per square inch.

(b) When in open condition, they did not provide obstacle-free, straight-through flow paths for the fluid.

(c) In at least one such valve, the gaseous products of the explosion were permitted to mix with the fluid passing through the valve, which is an intolerable condition for most major applications.

(d) The valves were relatively complex, frequently having relatively large numbers of components such as retraction mechanisms, multi-component locking mechanisms for the movable valve element, etc.

(e) Relatively powerful explosive squibs were required and which propelled the actuating elements through long strokes, the strokes frequently being such that the flow passage was at least momentarily partially blocked.

In another type of prior-art valve, and one capable of withstanding high pressures, an integral sealing head was sheared off by means of a long-stroke explosive-actuated pin. However, in such valve the actuating mechanism was necessarily large, and required a large squib and high-current firing signal. Furthermore, the actuating pin remained diametrically across the flow passage, creating flow-blocking and turbulence effects. When the fluid passed through the valve was gas at sonic velocities, the presence of the pin across the flow passage was especially undersirable in that shock effects resulted.

In view of the above and other defects and disadvantages of various forms of prior-art apparatus of the type indicated, it is an object of the present invention to provide a normally-closed explosive-operated valve which is extremely simple to construct and assemble yet is not subject to any of the above-indicated disadvantages.

A further object is to provide a normally-closed explosive-operated valve wherein valve opening is effected independently of fluid pressure, wherein no locking means are required for the movable valve element, wherein extremely high fluid pressures and flow rates may be employed, wherein flow through the valve is straight-through and completely unobstructed at all times, wherein no explosive products are permitted to mingle with the valve fluid, and wherein a relatively small squib may open the valve by actuating an element through a short distance.

A further object is to provide a normally-closed explosive-operated valve which produces a very clean, planar break in an integral inlet element, and which minimizes the tendency toward chipping of the valve in response to the breaking operation.

A further object is to provide a valve which is highly compact in construction, and a valve which may be readily employed with a plurality of squibs to produce redundancy in the firing or valve-opening operation.

These and other objects will become apparent from the following detailed description taken in connection with the accompanying drawing in which:

FIGURE 1 is a longitudinal central sectional view illustrating a valve constructed in accordance with the present invention, showing the same in closed condition;

FIGURE 2 is a fragmentary transverse sectional view on the broken line 2—2 of FIGURE 1;

FIGURE 3 is a fragmentary sectional view corresponding generally to FIGURE 1 but showing the valve in open condition; and FIGURE 4 is a transverse section taken on line 4—4 of FIGURE 3.

Referring to the drawing, the valve is illustrated to comprise a hallow cylindrical valve body or housing 10 having sufficient wall thickness to withstand very high fluid pressures, such as thousands of pounds per square inch. Associated with opposite end portions of the valve body 10 are an outlet element 11 and an inlet element 12 through which fluid (including any gas or liquid) is respectively discharged from and introduced into the valve chamber 13 defined by the valve body.

The outlet and inlet elements 11 and 12 are preferably coaxial with each other and with the valve chamber 13, so that a straight-through flow of fluid is effected through the valve. Such straight-through flow is highly desirable and, in combination with the obstruction-free relationship which occurs when the valve is in open condition, insures that the fluid flow through the valve will be maximized and relatively free of turbulence.

The illustrated outlet element 11 is a fitting which is threadedly and sealingly associated with body 10 by means of the illustrated threads 16 and the O-ring 17. It is emphasized, however, that the outlet may be integral with the body 10 or may be otherwise connected thereto. The outlet element or fitting is adapted (as with the illustrated threads) to be connected to a conduit means, not shown. Alternatively, for example, the outlet element may comprise a suitable nozzle or other orifice device.

The flow passage 18 through outlet element 11 is preferably relatively large in diameter, in order that a very large flow of fluid may be effected. The inlet region of the flow passage 18 is preferably rounded in order to minimize turbulence, it being pointed out that the diameter of chamber 13 is normally substantially larger than that of the flow passage 18 through the outlet.

Proceeding next to a description of the inlet element 12, this is illustrated to comprise a fitting portion 20 having sealingly connected therewith a sealing means comprising a movable valve element 21. Fitting 20 has formed therethrough an inlet flow passage 22 which is preferably coaxial with chamber 13 and with outlet flow passage 18. The illustrated fitting portion is adapted to be threadedly or otherwise connected with an inlet conduit, vessel, etc.

The fitting portion 20 may be any "wall means" having a flow passage or opening 22 therein or therethrough. Thus, for example, the "wall means" 20 may be the wall of a vessel, in which case passage 22 would be in the nature of an orifice.

In the illustrated valve, and similarly to the manner of association of the outlet element 11 with valve body 10, the inlet element 12 is threadedly connected to the valve body by being threaded at 23 into an internally-threaded portion of the body 10. An O-ring or other suitable seal 24 is provided at the interlocking threaded region 23 in order to prevent leakage of fluid from the valve body. The movable valve element 21 is sufficiently small in diameter to permit threading of the inlet element 12 into the valve body 10 as illustrated.

The movable valve element 21 is a rigid member which is integrally associated with the fitting portion (or wall means) 20 in order to effect a zero-leakage relationship with respect to the gas or liquid present in inlet passage 22. Such rigid element 21 is pivotally mounted in such relationship that it may open, in the manner of a flap or trap door, to a position (FIGURE 3) at which there is a straight-through flow passage between the inlet and outlet passages 22 and 18. The axis of pivotal movement is located a sufficient distance radially-outwardly from the center (axis) of flow passage 22 that fluid may flow in substantially unimpeded relationship through the valve when movable valve element 21 is in open position. Thus, the element 21 pivots away from the passage or opening 22. This is to be distinguished from butterfly-type valve elements, wherein the pivot axis is across the inlet passage so that the movable vessel valve element (even when in open position) obstructs the flow passage. In such butterfly valves, a part of the movable element pivots into (not away from) the inlet passage.

In the illustrated embodiment, the member 21 is pivotally mounted to the valve housing 10 by means of a strong pin 26 which extends through a bore 27 provided through the element 21 at a region spaced radially-outwardly from the edge or peripheral region of inlet flow passage or opening 22. Stated otherwise, the pin 26 should be located a substantial distance radially-outwardly from the cylindrical wall (peripheral region) of flow passage 22 in order that the member 21, when in the open position of FIGURE 3, will not obstruct fluid flow. The pin 26 is also mounted sufficiently far from fitting portion 20, from valve housing 10, etc., that pivotal opening of the member 21 to the position of FIGURE 3 will not be obstructed.

The pin 26 is, in the illustrated embodiment, inserted through an internally-threaded boss portion 28 (FIGURE 2) of valve body 10, being then extended through the bore 27 into a socket portion 29 formed in the valve body opposite the boss portion. The outer end of the pin 26 is externally threaded at 30 for mating with the internally-threaded bass. A suitable sealing ring 31 is provided to prevent leakage of fluid from chamber 13. In the illustrated form, the outer end of the pin is shaped hexagonally for actuation by a suitable wrench.

It is also within the scope of the invention to pivotally mount the movable valve member 21 in other ways. Thus, for example, it may be pivotally connected directly to the fitting portion 20 instead of directly to the housing 10. In either event, the movable valve member 21 is pivotally related to the housing because of the direct connection between the fitting 20 and the housing.

The sides 32 and 33 (FIGURES 2 and 4) of the valve member 21 are milled off, after the inlet element 12 (including portions 20 and 21) is machined, in order to prevent premature contact of the member 21 with the wall of valve chamber 13 as the member 21 pivots to open position. Thus, such sides 32 and 33 are caused to be perpendicular to pin 26 and are spaced from each other a distance greater than the diameter of inlet flow passage 22.

In order to minimize the shock incident to contact between movable valve element 21 and the wall of valve chamber 13, the edge regions of element 21 are beveled as indicated at 34 and 35 in FIGURES 2 and 4. Also in order to minimize shock, while maintaining the rigidity of the valve member 21, a recess 36 is formed in the central region of the member 21, on the side thereof remote from passage 22. The weight of the member 21 is thus minimized.

With the described construction, incorporating the recess 36, the movable valve member 21 is caused to be extremely rigid yet not excessively heavy. It is emphasized that the member 21 is in no sense a diaphragm, being instead a rigid member capable of actuation in the extremely simple and effective manner to be described hereinafter. It is pointed out that the recess 36 is not essential to the operation of the valve.

A deep, narrow, annular groove 38 is formed (as by machining) in the inlet element 12 between the fitting portion 20 and the movable valve portion 21 thereof. The illustrated groove has opposed side walls 39 and 40 both of which are perpendicular to the axis of the valve. One such wall, number 39, is preferably disposed more remote from the outlet element 11 than is the inner end wall 41 of passage 22, which wall 41 is also shown as being perpendicular to the valve axis. The other wall, number 40, is closer to outlet element 11 than is the wall 41. The bottom wall 42 of annular groove 38 is preferably not cylindrical but is instead frustoconical, the base region of the frustum meeting wall 40.

There is thus formed, at regions radially-inwardly of the wall 39, an integral stress-riser portion or region 43 the cross-sectional area of which is much smaller than that of any adjacent region. Accordingly, when the valve member 21 is pivoted as will be described, failure occurs at such stress-riser region 43 to produce a clean, chip-free fracture lying in substantially a single plane.

The stress-riser region 43 encompasses the passage or opening 22, thus effectively sealing the same as indicated above. The region 43 is sufficiently small to be frangible in response to operation of the valve actuator, but sufficiently large to withstand the fluid pressure present in passage 22.

There will next be described the small, simple and short-stroke means for effecting fracture at stress-riser region 43 and thus opening the member 21 to the position of FIGURE 3. Such means includes a ram or plunger 46 adapted to forcibly engage the region of valve member 21 generally opposite the pivot pin 26. A portion of ram or plunger 46 is a wedge or inclined-plane element adapted to be inserted in wedging relationship into the annular groove 38 in response to radially-inward movement of the ram toward pin 26.

Stated more definitely, the illustrated ram or plunger 46 is disposed along an extended radius of passage 22, being perpendicular to the axis of opening 22 and to the pin 26. It is pointed out, however, that redundant operation of the valve may be achieved by locating at least one additional ram adjacent the illustrated ram 46 and operated by a squib means separate from that to be described below.

The specific explosive means for actuating the ram 46 radially-inwardly is illustrated to comprise a strong cylindrical housing 47 which is threaded into valve body 10 at an internally-threaded boss region 48 thereof, a suitable sealing ring 49 being provided at the threaded area. A piston 51 is provided at the outer end of ram 46, being mounted slidably in a longitudinal cylindrical passage formed with the housing 47. Piston 51 incorporates a sealing ring 52 adapted to insure against escape of gaseous products of the explosion during travel of the ram. Furthermore, the piston incorporates a frustoconical region 53 adapted to come into metal-to-metal sealing engagement with a generally corresponding frustoconical region 54 of the interior wall of housing 47.

An explosive device or squib 57 is threadedly inserted into the outer end of housing 47, being sealed in position as by an O-ring 58.

Upon firing of the squib 57, which is conventionally effected by supplying an electrical igniting signal thereto, the resulting explosion forces the piston 51 downwardly through a predetermined distance until the tapered portion 53 is stopped by the generally correspondingly tapered region 54 of the chamber wall (and by the necked-down lower end of the chamber). During this movement, gaseous products of the explosion cannot escape because of the action of the sealing rings 52 and 58. A final and highly effective seal is provided when the tapered regions 53 and 54 come into metal-to-metal sealing contact with each other, thus effectually preventing escape of any products of the explosion into the valve chamber 13 where they would mingle with the gas or liquid passed through the valve.

The described radially-inward movement of the piston effects a corresponding movement of the ram 46. The inner end of the ram is formed (on the side adjacent outlet element 11) with a tapered or beveled surface 60 which lies in a plane inclined relative to the plane of stress-riser region 43. Such plane containing the inclined face 60 intersects the axis of inlet flow passage 22 at a region spaced a substantial distance from end wall 41 of the flow passage. The angle of taper may be, for example, on the order of 30 degrees relative to a plane which is perpendicular to the axis of the valve. The edge region of member 21 which is abutted by the surface 60 is preferably tapered or beveled correspondingly thereto as illustrated in FIGURE 1.

The described radially-inward movement of plunger 46 causes the wedge-like inner end of the ram or plunger to extend into the annular groove 38 and pry or wedge the rigid movable valve member 21 sufficiently to effect a fracture at the stress-riser 43 and cause opening of the valve to the FIGURE 3 position. The required stroke of the piston 51 and ram 46 may be very short, and is preferably insufficient to cause the inner end of the ram 46 to block any part of flow passage 22. Thus, the ram does not in any sense impede flow of fluid through the valve.

The path of movement of the ram 46 is controlled by causing the same to extend slidably through a bore in the inner end of actuator housing 47 and a corresponding bore through the valve housing 10. Furthermore, the relationship between the parts should be such that the radial groove wall 39 is disposed radially adjacent the portion of the ram most remote from outlet element 11. Stated otherwise, surface 39 is preferably tangential to the ram 46 (which is normally cylindrical) so that the surface 39 operates as a guide means for the ram during its radially-inward movement.

It is emphasized that the desired wedging relationship relative to movable valve element 21 may also be achieved in certain other ways, the important factors being that a high mechanical advantage be obtained, and that valve opening be effected in response to a short stroke of the ram.

The axis of pivotal movement of element 21 is shown as being generally perpendicular to the axis of stress-riser 43 and to the axis of passage or opening 22. The element 21 is shown as generally planar in shape, being disposed (when in closed position) perpendicular to the axis of the stress-riser and to the axis of opening 22. The plane of element 21 is shown as parallel to, and preferably containing, the pivot pin 26.

The ram 46 preferably moves in a plane generally parallel to the plane of element 21, and in such relationship to pin 26 that the ram creates a valve-opening torque. The element 21 will then shift to the open position of FIGURE 3 even in the absence of fluid within passage 22. Thus, the extended axis of ram 46 is shown as passing between surface 39 and the axis of pin 26.

Operation

The valve is readily assembled by merely threading the inlet element 12 into one end of housing 10, and threading the outlet element 11 into the opposite end thereof. The hinge pin 26 is then inserted through boss 28 and bore 27 (FIGURE 2), and the squib housing 47 is threaded into the boss 48.

Liquid or gas is then caused to be present in inlet passage 22, and may have a pressure on the order of thousands of pounds per square inch. However, it may also have a low pressure because the opening of the movable valve element 21 is not dependent upon the fluid pressure within passage 22.

When it is desired to effect opening of the valve, an electrical firing signal is fed to the squib 57. The squib is thus ignited and operates as described above to force the piston 51 and associated ram 46 downwardly from the FIGURE 1 position to the FIGURE 3 position. The gaseous products of the explosion are permanently contained within the housing 47, as distinguished from entering the valve chamber 13 for commingling with the fluid passed therethrough.

The wedge or inclined-plane relationship of surface 60 relative to movable valve element 21 creates a high mechanical advantage, which is one of the factors permitting the squib 57 to be small and yet open the valve successfully.

Another and basic reason why the squib 57 may be small is that the initial radially-inward movement of the ram 46 creates an extreme stress concentration at the portion of the stress-riser 43 closest to the ram end. In other words, during the first short increment of ram travel, the stress concentration closely adjacent the ram is very extreme, which immediately causes fracture at such stress-riser region adjacent the ram. At this time, there is no fracture at regions of the stress-riser 43 remote from the ram.

During the next short increment of ram travel, the fracture region progressively widens in extent and, as the ram continues its inward movement, the fracture region moves circumferentially around the stress-riser 43 until, finally, the fracture is complete and the valve element 21 immediately shifts to the fully open position of FIGURE 3.

It is pointed out that, with a groove 38 and cooperating stress-riser region 43 of the type shown in the drawing, the failure at the stress-riser is in tension and is not in shear. The shear loading is borne largely by the pin 26, which prevents downward shifting of the element 21 in response to downward shifting of the ram 46. Instead, downward shifting of the ram effects clockwise pivotal movement of the element 21 between the FIGURE 1 and FIGURE 3 positions.

The above-stated rigidity of element 21 is of importance to the invention. If element 21 were a mere thin diaphragm, and not rigid, there would merely be a bending action which would prevent the fracture from traveling circumferentially of the stress-riser region 43 to complete the opening of the valve.

It is emphasized that, during the initial portion of inward ram travel, the amount of shifting of the rigid valve element 21 at points adjacent the ram is much larger than the amount of shifting thereof at points adjacent pin 26. One reason for this is that the pin 26 forces the element 21 to follow a predetermined pivotal path.

In summary, therefore, the combination of the pivotally-mounted rigid element 21, the stress-concentration and wedge action effected between ram 46 and such element 21, and other factors, permit a relatively large-diameter member 21 to be opened with a surprisingly short ram travel effected by a small, compact explosive device. As but one of numerous examples, an element 21 covering a flow passage 22 having a diameter of about 1¼ inches may be opened by a squib having a diameter of only ½ inch and by radially-inward ram travel of only about ¼ inch.

After opening is effected as described above, and independently of fluid in inlet 22, the fluid rushing from inlet 22 through chamber 13 to outlet 18 operates effectively to prevent element 21 from shifting away from the open position illustrated in FIG. 3. However, and if desired, suitable detent means, latch means, etc., may be provided to maintain the element 21 in its open position.

It is again emphasized that the flow may be straight-through, there being nothing at all blocking the inlet 22, and outlet 18 or the valve chamber 13. This is to be contrasted with various prior-art valves wherein a butterfly or pin element is disposed across inlet 22. Such elements not only obstruct flow but, where the flow is sonic, create shock conditions which are highly deleterious to the valve action.

The diameters of passages 22, 18, etc., may be made substantially larger and still result in an operative construction, utilizing a small squib 57 with a short-stroke ram. This is to be contrasted with prior-art valves of the type wherein major increases in the diameters of the passage 22 effect corresponding increases in the travel required of the ram, so that the ram stroke becomes extreme.

The valve may be small in size, it being pointed out that the valve housing 10 may be made much smaller than the one illustrated. For example, and referring to FIGURE 2, the sides of the housing may be shifted toward each other, in a horizontal direction, until they are closely adjacent the milled sides 32 and 33 of the element 21.

After operation, the valve housing 10 and outlet 11 are reusable, it being merely necessary to unthread the squib housing 47, unthread the inlet element 12, and substitute a new inlet 12 and a new squib and ram assembly.

The valve may be formed of various substances, for example aluminum alloys, stainless steel, etc. As but one of numerous examples, the valve may be formed of 61ST6 aluminum alloy.

The term "integral," as employed in the present specification and claims, comprehends connections made by soldering, welding, brazing, and by adhesives, although true one-piece constructions are preferred.

I claim:
1. A normally-closed valve, which comprises:
    wall means having a discharge opening therein,
    means to seal off said opening to prevent flow of fluid therethrough,
    said sealing means including a movable valve element disposed in blocking relationship relative to said opening,
    said movable valve element being connected to said wall means by a frangible connection encompassing said opening to thus achieve a zero-leakage relationship,
    said movable valve element being rigid,
    means to pivotally mount said movable valve element for movement about a predetermined pivot axis,
    said axis being disposed radially-outwardly from said opening, and
    actuating means to create a concentrated breaking stress in said frangible connection to a region thereof remote from said axis and in such manner that said frangible connection is broken first at said region remote from said axis, and then progressively toward the region of said frangible connection which is adjacent said axis, whereby to effect pivotal movement of said movable valve element to open position and consequent unimpeded flow of fluid through said opening.

2. The invention as claimed in claim 1, in which said actuating means is an explosive-driven ram.

3. The invention as claimed in claim 1, in which said pivot axis is generally perpendicular to the axis of said opening and in which said actuating means is an elongated explosive operated ram disposed radially-outwardly from the side of said opening remote from said pivot axis.

4. The invention as claimed in claim 3, in which the axis of said ram is generally perpendicular to said axis of said opening, and in which said ram is adapted to move toward said pivot axis in response to detonation of the explosive charge.

5. The invention as claimed in claim 3, in which said ram is disposed in wedging relationship relative to a peripheral portion of said movable valve element, and is adapted to move toward said pivot axis in response to detonation of the explosive charge, whereby a mechanical advantage is achieved upon detonation of the explosive.

6. The invention as claimed in claim 5, in which said frangible connection lies in a plane which is generally perpendicular to said axis of said opening, whereby said connection breaks in tension and not in shear.

7. A normally-closed valve, which comprises:
    wall means having a discharge opening therein,
    a movable valve element disposed in blocking relationship relative to said opening,
    said movable valve element being sealingly connected to said wall means by a frangible connection encompassing said opening, and permitting zero leakage through said opening, and
    actuating means to apply a localized stress to said movable valve element in such manner that said frangible connection is broken to thus permit movement of said movable valve element to open position and consequent flow of fluid through said opening,
    said actuating means comprising ram means to create a wedging force between said movable valve element and said wall means to thus effect said breaking of said frangible connection,
    said actuating means further comprising explosive means to shift said ram means in order to create said wedging force.

8. The invention as claimed in claim 7, in which a peripheral portion of said movable valve element is disposed radially outwardly from said frangible connection, and in which said ram means has an end portion disposed in wedging relationship relative to said peripheral portion of said movable valve element.

9. The invention as claimed in claim 1, in which said ram means is an elongated element disposed generally perpendicular to the axis of said opening, in which said explosive means is a squib located adjacent the end of said elongated element which is remote from said axis of said opening, and in which said elongated element has an inclined portion located relatively adjacent said axis of said opening.

10. The invention as claimed in claim 9, in which stop means are provided to prevent movement of said elongated element toward said opening through a distance sufficient that any substantial portion of said elongated element is disposed in substantial flow-blocking relationship relative to said opening.

11. The invention as claimed in claim 7, in which said frangible connection lies in a plane which is generally perpendicular to the axis of said opening, whereby said connection breaks in tension and not in shear.

12. A normally-closed explosive-operated valve, which comprises:
a valve body defining a valve chamber,
said valve body having an outlet opening therefrom communicating with said chamber,
an inlet member mounted sealingly in said body opposite said outlet opening,
said inlet member having an inlet portion located relatively remote from said outlet opening,
said inlet portion having an inlet flow opening therethrough,
said inlet member also having a movable valve element located in said valve chamber relatively adjacent said outlet opening,
said movable valve element being integrally connected to said inlet member by means of a frangible stress-riser section encompassing said inlet opening to thus achieve a zero-leakage relationship,
said movable valve element being rigid and being disposed when in closed position in a plane generally perpendicular to the axis of said inlet opening,
hinge means operably associated with said movable valve element to cause the movement thereof to be about a predetermined pivot axis which is generally parallel to said plane and is disposed to one side of said inlet opening, and
explosive-operated ram means located on the opposite side of said inlet opening to create a concentrated stress in an adjacent region of said frangible stress-riser section and thereby progressively fracture said entire stress-riser section for pivoting of said movable valve element about said pivot axis to open position.

13. The invention as claimed in claim 12, in which the size of said movable valve element is so correlated to the size of said valve chamber that said movable valve element many move pivotally toward said outlet opening and about said pivot axis from said closed position in said plane to an open position parallel to the axis of said inlet opening.

14. The invention as claimed in claim 12, in which said hinge means comprises a hinge pin extending through said valve body and also extending through a peripheral region of said movable valve element.

15. The invention as claimed in claim 12, in which said explosive-operated ram means comprises a ram mounted for movement in a direction generally parallel to said plane and generally perpendicular to said pivot axis, and in which said explosive-operated ram means further comprises a squib mounted in a position adjacent the end of said ram relatively remote from said pivot axis, said ram being so related to said movable valve element that detonation of said squib and consequent movement of said ram toward said axis effects said fracture of said stress-riser section.

16. The invention as claimed in claim 15, in which means are provided to prevent the products of the explosion resulting from detonation of said squib to enter said valve chamber.

17. The invention as claimed in claim 12, in which said frangible stress-riser section between said movable valve element and said inlet member is disposed radially inwardly of an annular groove formed between said movable valve element and inlet member, and in which said explosive-operated ram means includes a ram having an inclined portion extending into said groove and adapted in response to explosive propulsion of said ram toward said pivot axis to create a wedging relationship with the walls of said groove whereby said frangible stress-riser section is fractured.

18. The invention as claimed in claim 17, in which the bottom wall of said annular groove is generally frusto-conical.

19. The invention as claimed in claim 17, in which said ram is disposed generally perpendicular to said pivot axis, and in which means are provided to limit the movement of said ram toward said pivot axis to an amount sufficiently small that no substantial portion of said ram is in flow-impeding relationship relative to said inlet opening after said movement of said ram.

20. The invention as claimed in claim 17, in which one side of said ram is in sliding engagement with the wall of said annular groove relatively remote from said outlet opening, and in which the other side of said ram is in inclined-plane relationship relative to the wall of said annular groove relatively adjacent said outlet opening whereby said ram when shifted toward said predetermined axis wedges between said walls of said annular groove to effect said fracture of said frangible stress-riser section.

21. The invention as claimed in claim 12, in which the axis of said ram means is so related to said pivot axis that operation of said ram means creates a torque effecting pivoting of said movable valve element about said pivot axis to an open position such that a portion of said movable valve element is relatively close to said outlet opening.

22. The invention as claimed in claim 12, in which said frangible stress-riser section lies in a plane which is generally perpendicular to the axis of said inlet opening, whereby said section breaks in tension and not in shear.

23. A normally-closed valve, which comprises:
wall means having a discharge opening therein,
means to seal off said opening to prevent flow of fluid therethrough,
said sealing means including a movable valve element disposed in blocking relationship relative to said opening,
said movable valve element being connected to said wall means by a frangible connection encompassing said opening to thus achieve a zero-leakage relationship,
said movable valve element being rigid,
means to pivotally mount said movable valve element for movement about a predetermined axis,
said axis being disposed sufficiently far to one side of the center of said opening that fluid may flow in substantially unimpeded manner through said opening in response to pivotal movement of said movable valve element to open position, and
actuating means to create a concentrated stress in said rigid movable valve element at a region thereof remote from said axis and in such manner that said frangible connection is broken to permit pivotal movement of said movable valve element to open position and consequent unimpeded flow of fluid through said opening,
said pivotal-mounting means being located in outwardly-spaced relationship from one peripheral portion of said opening, and said actuating means being located in outwardly-spaced relationship from an opposite peripheral portion of said opening, whereby neither said pivot-mounting means nor said actuating means blocks flow of fluid through said opening when said movable valve element is in open position.

References Cited
UNITED STATES PATENTS

| | | | |
|---|---|---|---|
| 1,388,246 | 8/1921 | Elliott | 251—228 |
| 1,647,036 | 10/1927 | Dileo | 251—298 |
| 1,970,964 | 8/1934 | Hosmer | 251—158 |
| 3,134,390 | 5/1964 | Porter | 137—68 |

FOREIGN PATENTS 9,056   4/1898   Great Britain.

WILLIAM F. O'DEA, Primary Examiner
RICHARD GERARD, Assistant Examiner

U.S. Cl. X.R.

220—47; 251—158, 228

PO-
(5/)

UNITED STATES PATENT OFFICE
CERTIFICATE OF CORRECTION

Patent No. 3,474,809  Dated October 28, 1969

Inventor(s) William Gordon

It is certified that error appears in the above-identified patent and that said Letters Patent are hereby corrected as shown below:

Column 8, line 13, cancel "to" and substitute -- at --; lines 49 through 58 should read as follows:
-- said movable valve element being sealingly connected to said wall means by a frangible connection encompassing said opening, and permitting zero leakage through said opening, and
actuating means to apply a localized stress to said movable valve element in such manner that said frangible connection is broken to thus permit movement of said movable valve element to open position and consequent flow of fluid through said opening, --;
line 72, cancel "1" and substitute -- 7 --.

SIGNED AND
SEALED
JUN 16 1970

(SEAL)
Attest:

Edward M. Fletcher, Jr.
Attesting Officer

WILLIAM E. SCHUYLER, JR.
Commissioner of Patents